(12) United States Patent
Lee et al.

(10) Patent No.: US 7,689,568 B2
(45) Date of Patent: Mar. 30, 2010

(54) COMMUNICATION SYSTEM

(75) Inventors: Johnsee Lee, Hsinchu (TW); Ping-Hsun Wu, Hsinchu (TW); Sheng-Feng Lee, Hsinchu (TW); Wen-Shen Feng, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 307 days.

(21) Appl. No.: 11/647,907

(22) Filed: Dec. 28, 2006

(65) Prior Publication Data
US 2008/0159508 A1    Jul. 3, 2008

(51) Int. Cl.
*G06F 17/30* (2006.01)
(52) U.S. Cl. .................... 707/10; 707/1; 707/200; 370/260; 370/329; 370/352; 370/401
(58) Field of Classification Search .................... 707/1, 707/10, 200; 370/260, 400, 329, 352, 401; 455/569.1, 550, 557, 518; 709/204
See application file for complete search history.

(56) References Cited

U.S. PATENT DOCUMENTS

| | | | | |
|---|---|---|---|---|
| 4,054,908 A | * | 10/1977 | Poirier et al. | 348/14.09 |
| 4,658,425 A | * | 4/1987 | Julstrom | 381/81 |
| 4,882,743 A | * | 11/1989 | Mahmoud | 348/14.09 |
| 5,172,410 A | * | 12/1992 | Chace | 379/388.02 |
| 5,255,264 A | * | 10/1993 | Cotton et al. | 370/286 |
| 5,495,522 A | * | 2/1996 | Allen et al. | 379/202.01 |
| 5,732,071 A | * | 3/1998 | Saito et al. | 370/255 |

(Continued)

FOREIGN PATENT DOCUMENTS

CN    1428029 A    7/2003

(Continued)

OTHER PUBLICATIONS

"Adaptation and Mobility in wireless information systems"—Randy H. Katz—IEEE Communications Magazine, 2002—Adaptation and Mobility in Wireless Information Systems—Aug. 18, 1995 (pp. 1-19).*

(Continued)

*Primary Examiner*—Jean B. Fleurantin
*Assistant Examiner*—Anh Ly
(74) *Attorney, Agent, or Firm*—Finnegan, Henderson, Farabow, Garrett & Dunner, LLP

(57) ABSTRACT

A communication system comprises a bridge device being configured to manage multi-channel communications, a host terminal coupled to the bridge device through a first network, a participant terminal coupled to the bridge device through a second network, and a broadcasting device coupled to at least one of the host terminal and the bridge device for broadcasting at least one of the participant signals from the participant terminal and the host signals from the host terminal. The host terminal is configured to receive host signals and to transmit the host signals to the bridge device. The participant terminal is configured to receive participant signals and to transmit the participant signals to the bridge device. The bridge device is configured to receive the participant signals from the participant terminal and the host signals from the host terminal and transmit the participant signals from the participant terminal and the host signals from the host terminal only to the host terminal but not another participant terminal.

17 Claims, 6 Drawing Sheets

U.S. PATENT DOCUMENTS

| | | | | |
|---|---|---|---|---|
| 5,914,747 | A * | 6/1999 | Hamilton | 348/14.08 |
| 6,163,692 | A * | 12/2000 | Chakrabarti et al. | 455/416 |
| 6,339,842 | B1 * | 1/2002 | Fernandez et al. | 725/133 |
| 6,466,248 | B1 * | 10/2002 | Spann et al. | 348/14.08 |
| 6,606,305 | B1 * | 8/2003 | Boyle et al. | 370/260 |
| 6,763,266 | B1 * | 7/2004 | Kroll | 607/7 |
| 6,914,964 | B1 * | 7/2005 | Levine | 379/52 |
| 6,965,767 | B2 * | 11/2005 | Maggenti et al. | 455/416 |
| 6,987,992 | B2 * | 1/2006 | Hundal et al. | 455/569.1 |
| 7,006,616 | B1 * | 2/2006 | Christofferson et al. | 379/202.01 |
| 7,010,328 | B2 * | 3/2006 | Kawasaki et al. | 455/569.1 |
| 7,209,947 | B1 * | 4/2007 | Lee et al. | 709/204 |
| 7,313,745 | B1 * | 12/2007 | Mistely | 714/727 |
| 7,319,745 | B1 * | 1/2008 | Firestone | 379/202.01 |
| 7,353,997 | B2 * | 4/2008 | Tikhov et al. | 235/462.01 |
| 7,418,476 | B2 * | 8/2008 | Salesky et al. | 709/204 |
| 7,424,024 | B2 * | 9/2008 | Chen et al. | 370/401 |
| 7,492,729 | B2 * | 2/2009 | Shaffer et al. | 370/260 |
| 2003/0012149 | A1 * | 1/2003 | Maggenti et al. | 370/260 |
| 2004/0008680 | A1 * | 1/2004 | Moss et al. | 370/390 |
| 2005/0037708 | A1 * | 2/2005 | Torvinen | 455/41.2 |
| 2005/0058125 | A1 * | 3/2005 | Mutikainen et al. | 370/354 |
| 2005/0060480 | A1 * | 3/2005 | Solomon | 710/306 |
| 2005/0066001 | A1 * | 3/2005 | Benco et al. | 709/204 |
| 2005/0206721 | A1 * | 9/2005 | Bushmitch et al. | 348/14.09 |
| 2006/0069726 | A1 * | 3/2006 | McKibben et al. | 709/204 |
| 2006/0171337 | A1 * | 8/2006 | Shaffer et al. | 370/261 |
| 2006/0177046 | A1 * | 8/2006 | Falcon | 379/430 |
| 2006/0187859 | A1 * | 8/2006 | Shaffer et al. | 370/260 |
| 2006/0270447 | A1 * | 11/2006 | Everson et al. | 455/552.1 |
| 2007/0019798 | A1 * | 1/2007 | Voight et al. | 379/202.01 |
| 2007/0036317 | A1 * | 2/2007 | Shaffer et al. | 379/202.01 |
| 2007/0049261 | A1 * | 3/2007 | Joglekar | 455/416 |
| 2007/0087769 | A1 * | 4/2007 | Takahashi et al. | 455/518 |
| 2007/0111716 | A1 * | 5/2007 | Leigh et al. | 455/417 |
| 2007/0111743 | A1 * | 5/2007 | Leigh et al. | 455/518 |
| 2007/0123239 | A1 * | 5/2007 | Leigh et al. | 455/416 |
| 2007/0154001 | A1 * | 7/2007 | Rambo | 379/202.01 |
| 2007/0171898 | A1 * | 7/2007 | Salva | 370/356 |
| 2007/0202930 | A1 * | 8/2007 | Cao et al. | 455/570 |
| 2008/0065998 | A1 * | 3/2008 | Brown et al. | 715/755 |
| 2008/0125172 | A1 * | 5/2008 | Leon et al. | 455/557 |

FOREIGN PATENT DOCUMENTS

| | | |
|---|---|---|
| WO | WO 99/03253 A1 | 1/1999 |
| WO | WO 01/67675 A2 | 9/2001 |

OTHER PUBLICATIONS

Quality and performance of a desktop video conferencing system in the Network of Interconnected LANS—Harju et al.—Local Computer Network, Oct. 1994 (pp. 365-371).*

"Videoconferencing systems and Applications"—Brey et al.—Handbook of Internet computing, 2000—(pp. 1-33).*

* cited by examiner

COMMUNICATION SYSTEM

BACKGROUND OF THE INVENTION

This invention generally relates to communication systems and, more particularly, to a wireless communication system.

Generally, participants in a conference may ask questions and make contributions. In large conferences, it requires a microphone system with many microphones and loudspeakers for participants to use or share so that each participant attending the conference may hear the asked questions or contributions from other participants. For example, for meetings or conferences with hundreds or sometime thousands of attendees, it may not be cost effective to set up a system with hundreds or thousands of microphones and associated hardware and management systems. Additionally, sharing microphones among a group of attendees in certain applications or circumstances may cause inconvenience and/or poor audio quality.

U.S. Pat. No. 6,987,992 relates to a wireless microphone system illustrated in FIG. 1. Referring to FIG. 1, the system includes a number of wireless microphones at several remote stations and one signal processing unit at the central station. Each microphone includes an antenna for transmitting speech to a corresponding receiver in the signal processing unit. Thus, the number of receivers in the signal processing unit must be the same as the number of microphones used. As a result, when more microphones are desired, this system would require a large number of receivers at the central station, thereby increasing the size of the signal processing unit and the cost for the system. In addition, the system uses unassigned frequency band for signal transmission between the microphones and the signal processing unit. Because the frequency band is unassigned, it may get interference from other wireless communication devices, thereby increasing signal noise and modulation distortion.

Published patent application WO 99/03253 relates to a method and system illustrated in FIG. 2. Referring to FIG. 2, the system allows conference participants to use a mobile telephone or any other telephone as a conference microphone via Public Services Telephone Network (PSTN) and Public Land Mobile Network (PLMN). The telephone network may via private automatic branch exchange (PABX) connect to a control device which may couple to a loudspeaker device. The system of FIG. 2 uses GSM/VGCS half duplex transmission mode for signal transmission, and thus the signals may not be transmitted and received at the same time. In addition, the system of FIG. 2 may require each conference room to have a set of PABX and control device.

U.S. Patent Publication No. 2006/0187859 relates to a communication system with a number of user endpoints and a conference system, as illustrated in FIG. 3. The user endpoints of FIG. 3 may be an Internet Protocol (IP) phone 32, a computer 33, a cellular phone 34 or a corded telephone 35. The communication networks 40 may include wide area networks (WANs), PSTN, local area networks (LANs), intranets and Internet.

BRIEF SUMMARY OF THE INVENTION

One example consistent with the invention provides a communication system that includes a bridge device being configured to manage multi-channel communications, a host terminal coupled to the bridge device through a first network, and a participant terminal coupled to the bridge device through a second network. The system also includes a broadcasting device coupled to at least one of the host terminal and the bridge device for broadcasting at least one of the participant signals from the participant terminal and the host signals from the host terminal. In particular, the host terminal is configured to receive host signals and to transmit the host signals to the bridge device. The participant terminal is configured to receive participant signals and to transmit the participant signals to the bridge device. The bridge device is configured to receive the participant signals from the participant terminal and the host signals from the host terminal and transmit the participant signals from the participant terminal and the host signals from the host terminal only to the host terminal but not another participant terminal.

Another example consistent with the invention provides a method of operating a communication system. The method includes: receiving host signals from a host terminal to a bridge device via a first network; receiving participant signals from a participant terminal to the bridge device via a second network; processing the host signals and the participant signals received by the bridge device; transmitting processed signals from the bridge device only to the host terminal, and outputting output signals to a broadcasting device.

In another example, the invention provides a bridge device for multi-channel communications. The bridge device includes a receiving interface being configured for receiving signals via a first network from a number of terminals, a transmitting interface being configured for transmitting signals via a second network only to a terminal being identified as host, and a signal processing unit being configured for processing the signals received through the receiving interface.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended, exemplary drawings. It should be understood, however, that the invention is not limited to the precise arrangements and instrumentalities shown.

In the drawings.

DETAILED DESCRIPTION OF THE INVENTION

Figure 1:
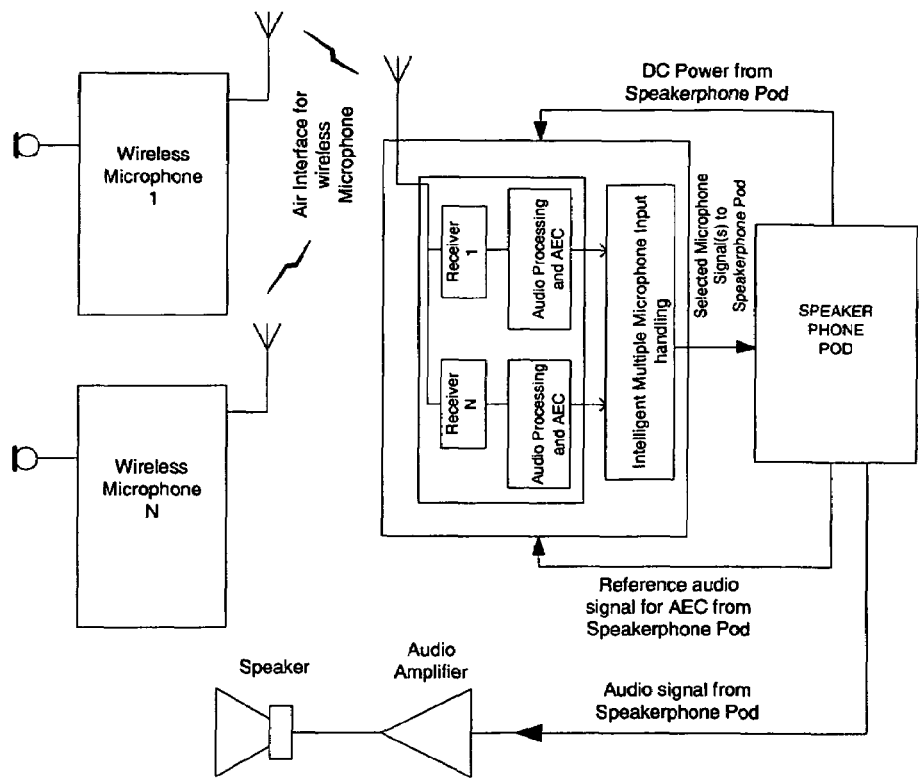
FIG. 1 is a schematic of a wireless microphone system.
Figure 2:
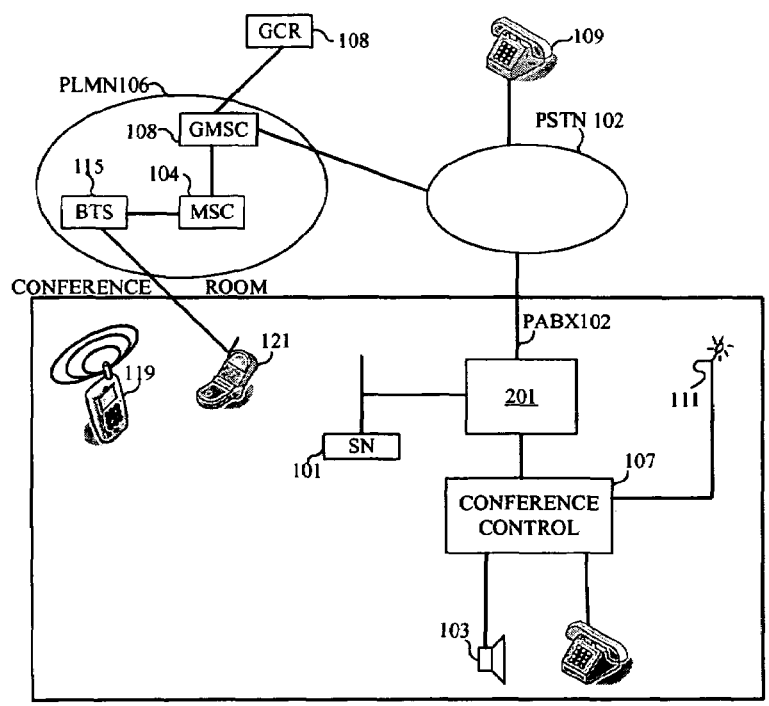
FIG. 2 illustrates a conferencing system.
Figure 3:
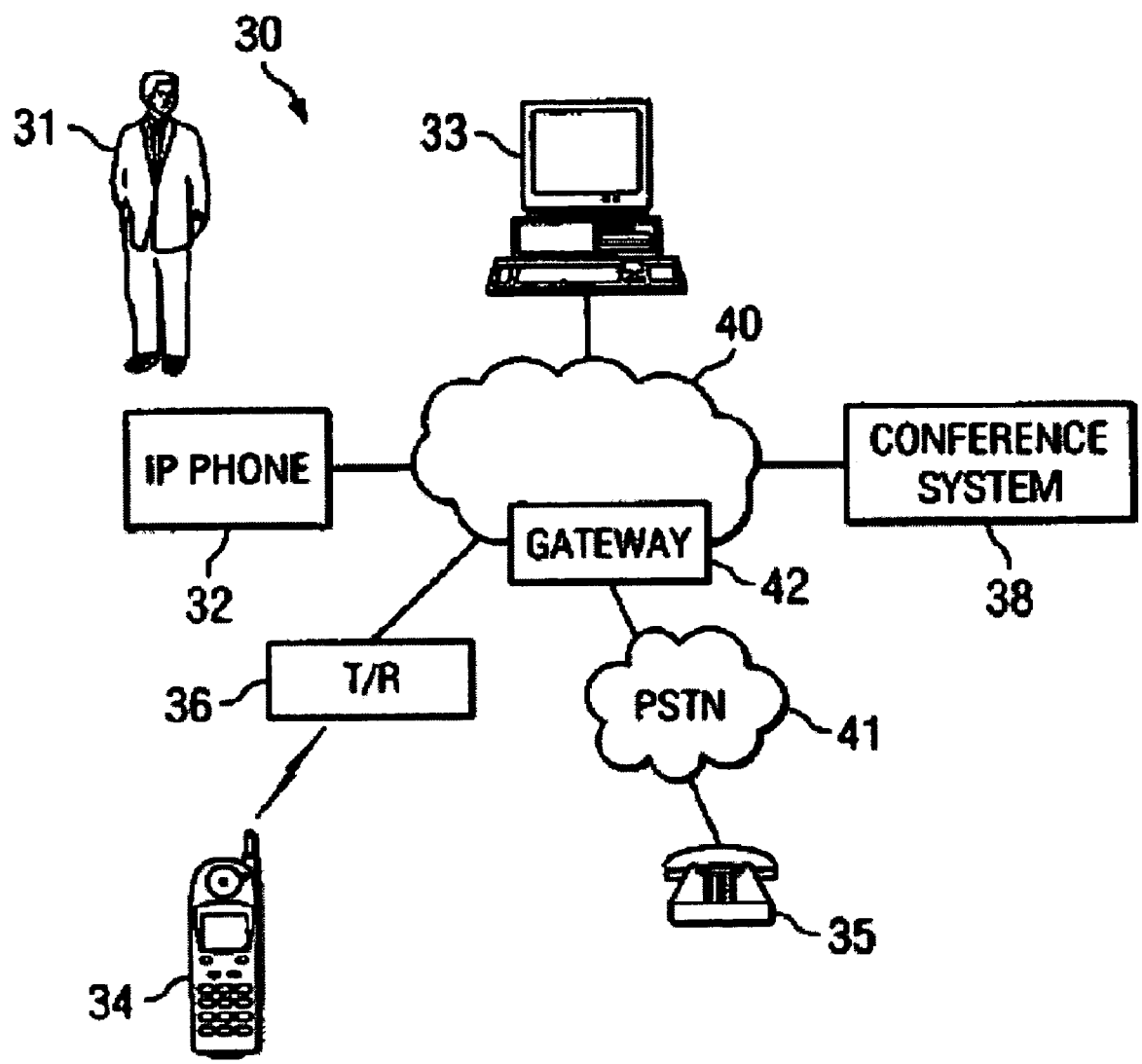
FIG. 3 illustrates a communication system.
Figure 4:
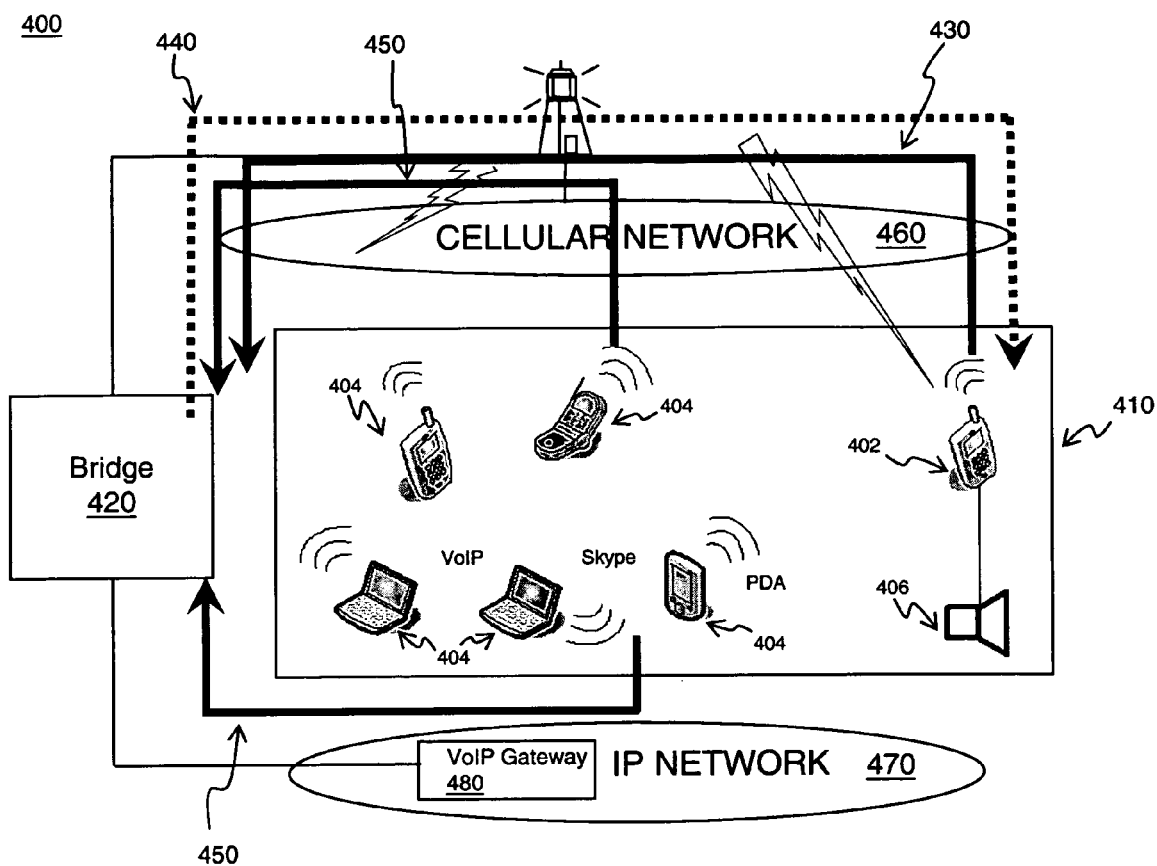
FIG. 4 illustrates an exemplary communication system in examples consistent with the present invention.

FIG. 4 illustrates an exemplary communication system 400 in examples consistent with the present invention. Referring to FIG. 4, the system 400 may include a host terminal 402 and a number of participant terminals 404 together in a room 410. The system 400 may also include a bridge device 420 which may be located outside of the room 410. Conferences, concerts or any other events using the communication system 400 may be audio only or may include video conferencing and broadcasting. In the case where more than one room is needed, additional host terminals may be added. In examples consistent with the present invention, the room 410 may be a conference room, hall, theater, stadium, arena, or an open field area.

The host terminal 402 may be any combination of hardware, software and/or encoded logic that provide communication services to a user. For example, the host terminal 402 may be a cellular phone, any other telephone, IP phone, a PDA or a computer. The host terminal 402 may include an input device to receive signals from the host, a signal processing unit to perform signal processing, a transmitting and receiving interfaces for signal transmission to and from a bridge device 420 that will be discussed in detail below. The signal processing unit may include a codec that converts voice, video or other signals generated by the host terminal from analog media signals into digital form. The codec may be implemented either in software or as special-purpose hardware in the host terminal. The host terminal 402 is connected to a broadcasting device 406, for example, a loudspeaker device which may include an audio amplifier and a loudspeaker. In the case where the signal includes video signals, the broadcasting device 406 may include a monitor or screen in addition to the loudspeaker device.

The transmitting interface of the host terminal 402 may transmit signals to the bridge device 420 along the arrow line 430 via communication networks. The receiving interface of the host terminal 402 may receive signals from the bridge device 420 along the dashed arrow line 440 via communication networks. The signals received by the host terminal 402 from the bridge device 420 are transmitted to the broadcasting device 406 for broadcasting.

Although FIG. 4 illustrates specific communication networks 460 and 470 as cellular network and IP network, communication network may include any network configured for transmitting audio and/or video telecommunications signals, data and/or messages. For example, communication network may be a WAN that enables communication between a plurality of participant terminals distributed across multiple cities and geographic regions, PSTN, Internet, Intranet, LANs, or any other form of wireless or wired communication network. Communication network may generally provide for the communication of packets, cells, frames and/or other portions of information between and among the terminals 402, 404 and the bridge device 420. Communication paths for the communication of such packets may include any combination of routers, hubs, switches, gateways (e.g., VoIP gateway 480 for interface with the IP-based device and the bridge device 420) or other hardware or software.

As the host terminal 402, the participant terminals 404 may, for example, a cellular phone, an IP phone, a PDA, any other telephone, or a computer. The terminals 404 may include an input device to receive signals from the participants, a signal processing unit to perform signal processing, and a transmitting interface for signal transmission to the bridge device 420 that will be discussed in detail below. The signal processing unit may include a codec that converts voice, video or other signals generated by the participant terminals from analog media signals into digital form. The codec may be implemented either in software or as special-purpose hardware in the participant terminals. The transmitting interface of the participant terminal 404 may transmit signals to the bridge device 420 along the arrow line 450 via communication network. Communication networks may be cellular network 460 or IP network 470 or any other network as discussed above.

The bridge device 420 may include any bridging or switching device used in support of multi-channel communications. The bridge device 420 may include a receiving interface configured for receiving signals from the host terminal 402 and the participant terminals 404, a transmitting interface configured for transmitting output signals only to the host terminal 402, and a signal processing unit to perform signal processing on the signals received by the bridge device 420 to generate output signal for transmission to the host terminal 402. In other words, the bridge device 420 may be configured to receive participant signals from the participant terminals 404 and the host signals from the host terminal 402, and configured to transmit the participant signals from the participant terminals 404 and the host signals from the host terminal 402 only to the host terminal 402 but not another participant terminal 404. The signal processing unit may include codecs that decode received signals from the terminals 402 and 404 and bridge the signals together to form a mixed signal for transmission to the host terminal 402. In addition, the signal processing unit in the bridge device 420 may include, for example, an acoustic echo cancellation unit for removing acoustically coupled signal from the audio signals. In one example consistent with the present invention, a loudspeaker or broadcasting device 406 may be coupled to the bridge device 420 for broadcasting information from the participant terminals 404 and information from the host terminal 402.

In examples consistent with the present invention, the bridge device 420 may comprise a multi-channel communication unit that hosts or accommodates multi-channel communications between the host terminal and the participant terminals. The host or participants may access the bridge device 420 by, for example, dialing a specific, pre-determined telephone number with a security access code for connection to the communication system 400. In other words, the bridge device 420 may include a second signal processing unit being configured for identifying a terminal status based on information associated from the host or participant terminals, such as access codes.

Figure 5:
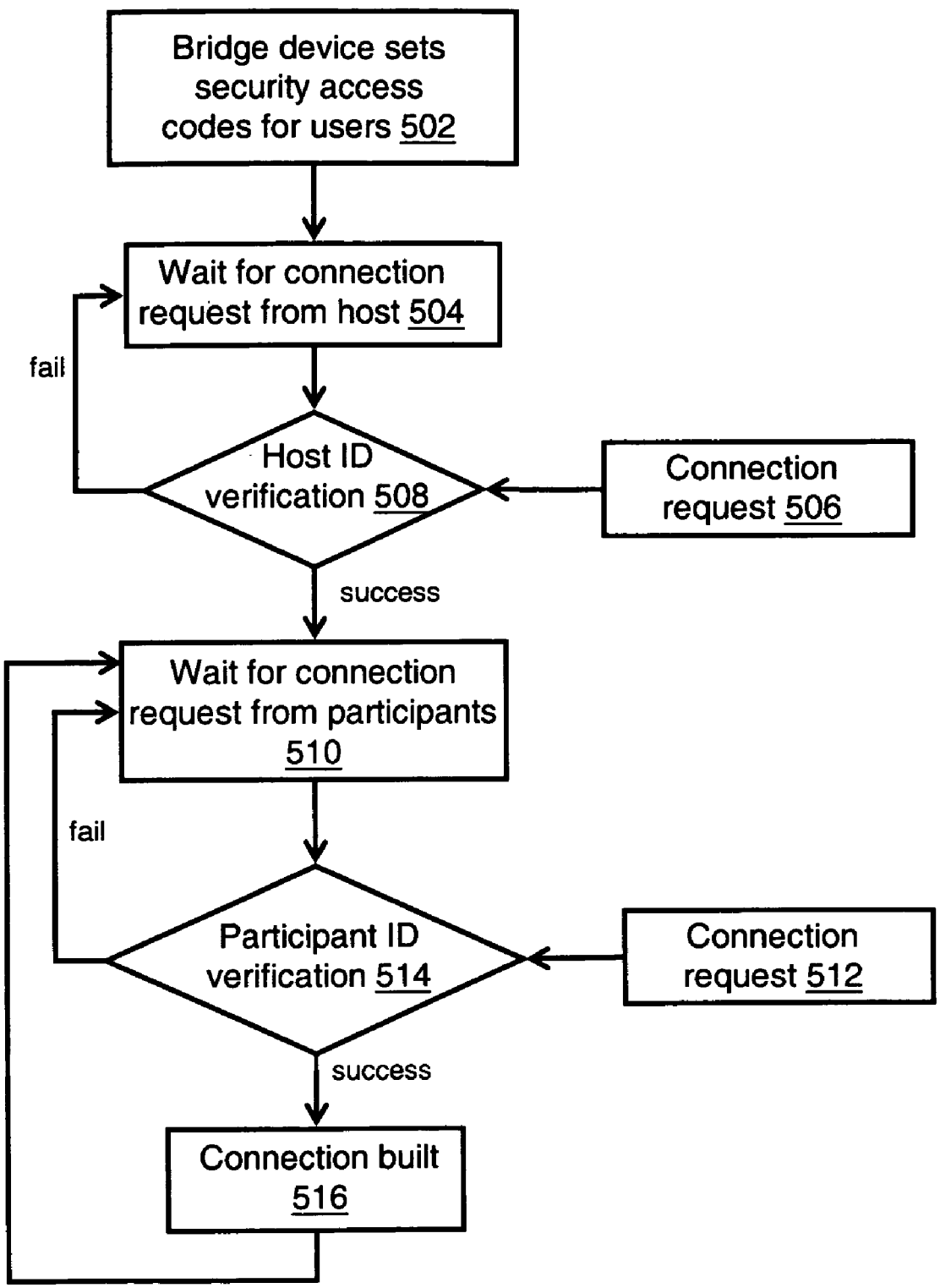
FIG. 5 illustrates an exemplary flow chart of system initiation on the part of the bridge device of FIG. 4.

FIG. 5 illustrates an exemplary flow chart of system initiation on the part of a bridge device. The bridge device first provides security access codes to the host and participants at step 502. The bridge device may set as many access codes as desired so that the host and participants may have different levels of administrative functions to manage the communication system. Administrative functions may include speaking sequence, whether to allow others to make contribution. At step 504, the bridge device waits for connection request from the host terminal. At step 506, the bridge device receives a connection request. At step 508, the bridge device determines whether the request is from the host terminal based on the access code. If not, it returns to step 504. If the request is verified as being sent from the host terminal, the communication system is initiated. The bridge device at step 510 waits for connection from participant terminals where the participants desire to make contributions. The bridge device may accept a connection request (step 512) if the connection request is verified as being sent from the participant terminals (step 514). At step 516, the requested participant terminal is connected to the system. After step 516, it returns to step 510 for the bridge device to wait for other connection requests.

Figure 6:
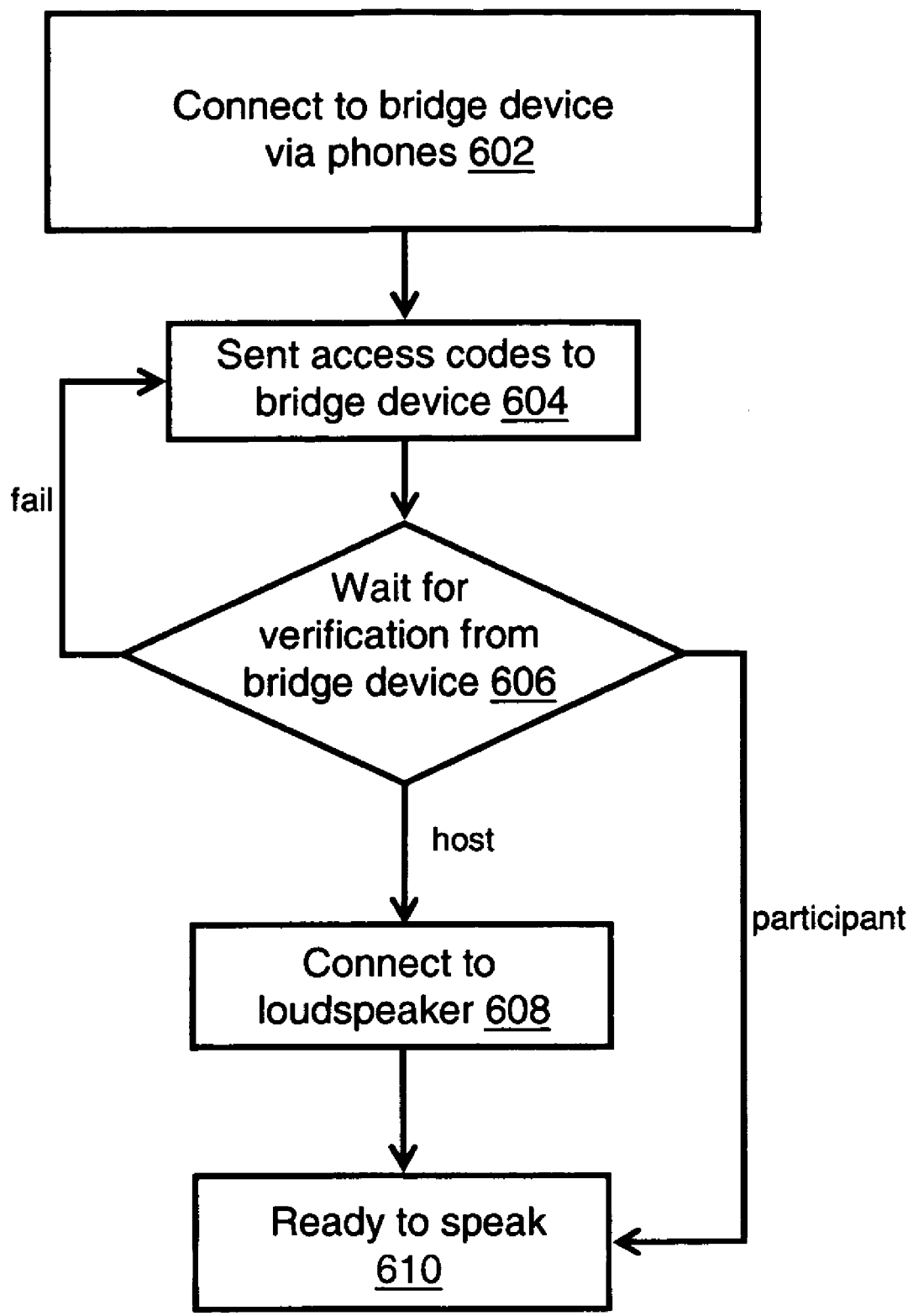
FIG. 6 illustrates an exemplary flow chart of system initiation on the part of the host and participant terminals of FIG. 4.

FIG. 6 illustrates an exemplary flow chart of system initiation on the part of a host terminal or participant terminals. At step 602, the host or participant terminals are connected to the bridge device, for example, via cellular network by dialing designated numbers or via IP-based network connection. Once connected, the host or participant terminals are required to send its access code to the bridge device (step 604) and wait for verification from the bridge device (step 606). Once verified as a host, the host terminal is connected to the loudspeaker or broadcasting device at step 608 and then the host terminal may start to transmit signals to the bridge device (step 610). On the other hand, if verified as a participant, the participant terminal may start to transmit signals to the bridge device (step 610).

Figure 7:
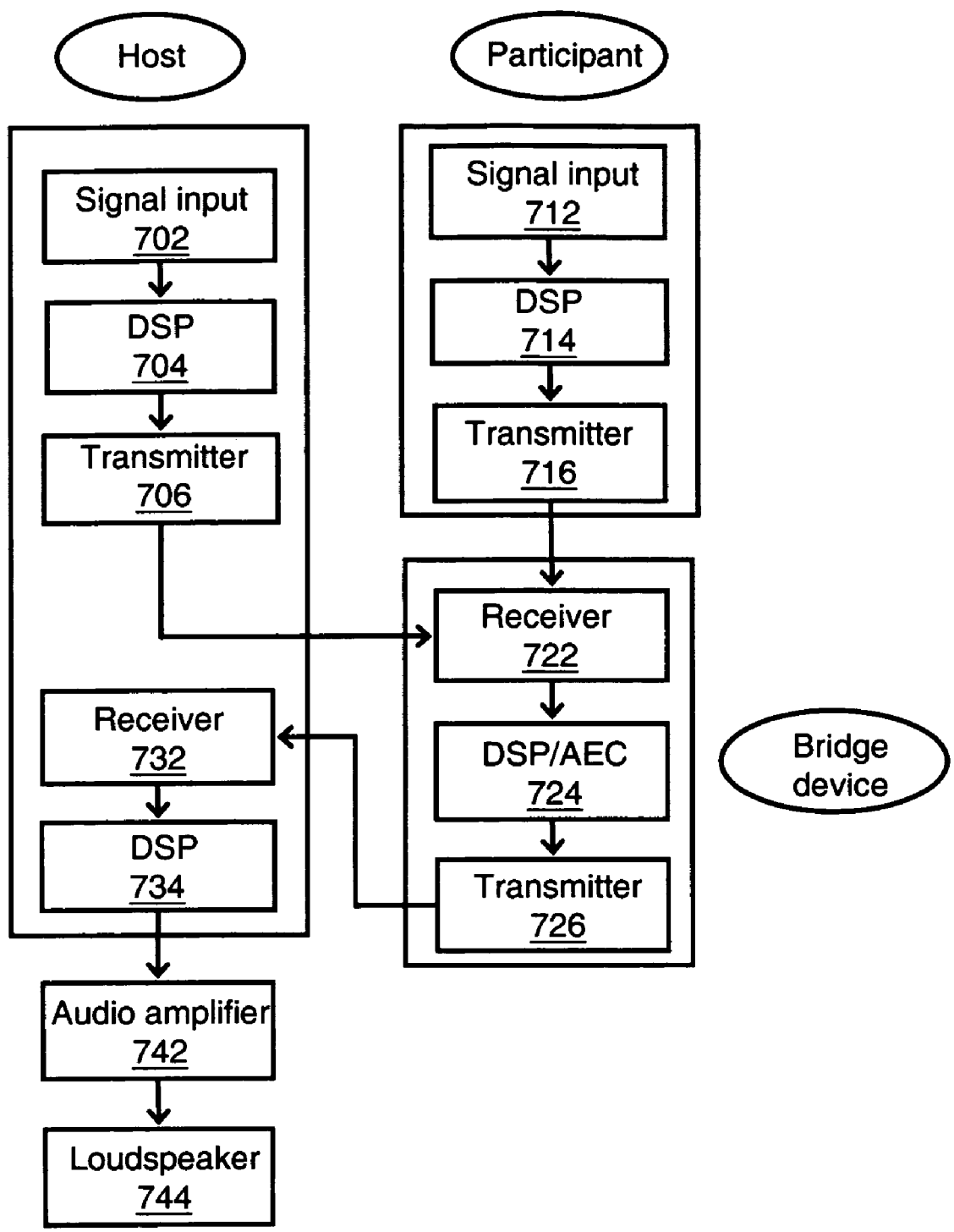
FIG. 7 illustrates an exemplary chart of system operation of FIG. 4.

Once connection is established, the host or the participants may start to speak or act. FIG. 7 illustrates an exemplary chart of system operation of FIG. 4. On the part of a host terminal, the host terminal receives signals from the host at step 702 via a receiving interface. The signal is then processed by a signal processor unit at step 704. At step 706, the processed host signals are then transmitted to the bridge device through a transmitting interface via communication networks. Similarly, on the part of a participant terminal, the participant terminal receives signals from the participant at step 712 via a receiving interface. The signal is processed by a signal processor unit at step 714. Then the processed participant signals are transmitted at step 716 to the bridge device through a transmitting interface via communication networks. At the bridge device, a receiving interface receives the host and participant signals at step 722. At step 724, the received signals are processed by a signal processing unit. In order to reduce echo, acoustic echo cancellation may be performed on the signals at step 724. After signal processing, the processed signals are transmitted through a transmitting interface to the host terminal at step 726 via communication networks. At the host terminal, a receiving interface receives signals from the bridge device at step 732. The signals from the bridge device are then processed by a signal processing unit at step 734. Thereafter, the processed signals are amplified at step 742 and sent to a loudspeaker or a broadcasting device for broadcasting at step 744.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

We claim:

1. A communication system, comprising:
a bridge device being configured to manage multi-channel communications, and identifying a terminal status based on information associated with at least one of the host and participant terminals;
the host terminal coupled to the bridge device through a first network, the host terminal being configured to receive host signals via a receiving interface and to transmit the host signals via a transmitting interface to the bridge device, the host terminal further including a signal processing unit being configured to process the output signals from the bridge device;
the participant terminal coupled to the bridge device through a second network, the participant terminal being configured to receive participant signals and to transmit the participant signals to the bridge device, the bridge device being configured to receive the participant signals from the participant terminal and the host signals from the host terminal and transmit the participant signals from the participant terminal and the host signals from the host terminal only to the host terminal but not another participant terminal; and
a broadcasting device coupled to at least one of the host terminal and the bridge device for broadcasting at least one of the participant signals from the participant terminal and the host signals from the host terminal.

2. The system of claim 1, wherein the bridge device includes a receiving interface being configured for receiving the host and participant signals from the host and participant terminals, a transmitting interface being configured for transmitting output signals to the host terminal, and a signal processing unit being configured to process signals received by the bridge device and generate the output signals.

3. The system of claim 2, wherein the signal processing unit of the bridge device is configured for performing an echo cancellation.

4. The system of claim 1, wherein the participant terminal includes a transmitting interface for transmitting the participant signals to the bridge device using at least a wireless interface.

5. The system of claim 1, wherein the first network and the second network include at least one of a cellular network, an Internet-protocol-based network, a wireless area network, Internet, an intranet, a local area network, and a public services telephone network.

6. The system of claim 1, wherein the broadcasting device includes an audio amplifier and a loudspeaker.

7. The system of claim 1, wherein the bridge device is configured for providing the host and participant terminals administrative functions to manage the system in accordance with information associated with the host and participant terminals.

8. A method of operating a communications system, comprising the steps of:
receiving host signals from a host terminal to a bridge device via a first network; wherein the host terminal includes a transmitting interface for transmitting the host signals to the bridge device and a receiving interface for receiving output signals from the bridge device, the host terminal further including a signal processing unit being configured to process the output signals from the bridge device;
receiving participant signals from a participant terminal to the bridge device via a second network;
processing the host signals and the participant signals received by the bridge device to verify an identity associated with at least one of the host terminal and the participant terminal, wherein processing the host signals and the participant signals includes:
receiving a first access code from the host terminal;
receiving a second access code from the participant terminal; and
identifying terminal statuses based on the first and the second access codes;
transmitting processed signals from the bridge device only to the host terminal; and
outputting output signals to a broadcasting device.

9. The method of claim 8, further comprising coupling at least one of the host terminal and the bridge device to the broadcasting device.

10. The method of claim 8, wherein processing the host signals and the participant signals includes performing an echo cancellation.

11. The method of claim 8, wherein the first network and the second network include at least one of a cellular network, an Internet-protocol-based network, a wireless area network, Internet, an intranet, a local area network, and a public services telephone network.

12. The method of claim 8 further comprising providing the host terminal and the participant terminal with administrative functions in accordance with information associated with the host terminal and the participant terminal.

13. A bridge device for multi-channel communications, the bridge device comprising:
   a receiving interface being configured for receiving signals via a first network from a number of terminals;
   a transmitting interlace being configured for transmitting signals via a second network only to a terminal being identified as host wherein the host terminal includes the transmitting interface for transmitting the host signals to the bridge device and a receiving interface for receiving output signals from the bridge device, the host terminal further including a signal processing unit being configured to process the output signals from the bridge device; and
   a signal processing unit being configured for processing the signals received through the receiving interlace, the bridge device further configured for identifying a terminal status.

14. The device of claim 13, wherein the signal processing unit is configured for performing an echo cancellation.

15. The device of claim 13, wherein the first network and the second network include at least one of a cellular network, an Internet-protocol-based network, a wireless area network, Internet, an intranet, a local area network, and a public services telephone network.

16. The device of claim 13 further comprising a second signal processing unit being configured for identifying terminal statuses in accordance with information associated with the terminals.

17. The device of claim 16, wherein the second processing unit is configured for providing administrative function to the terminals in accordance with the terminal statuses that are identified.

* * * * *

UNITED STATES PATENT AND TRADEMARK OFFICE
CERTIFICATE OF CORRECTION

| | |
|---|---|
| PATENT NO. | : 7,689,568 B2 |
| APPLICATION NO. | : 11/647907 |
| DATED | : March 30, 2010 |
| INVENTOR(S) | : Johnsee Lee et al. |

It is certified that error appears in the above-identified patent and that said Letters Patent is hereby corrected as shown below:

Claim 13, col. 7, line 7, "interlace" should read -- interface --.

Claim 13, col. 7, line 17, "interlace" should read -- interface --.

Signed and Sealed this

Eighth Day of June, 2010

David J. Kappos
*Director of the United States Patent and Trademark Office*